United States Patent
Kurian et al.

(10) Patent No.: US 12,425,321 B2
(45) Date of Patent: Sep. 23, 2025

(54) SYSTEMS FOR SEGMENTING AND CONTROLLING THE TRANSMISSION OF DATA IN COMPUTING NETWORKS

(71) Applicant: BANK OF AMERICA CORPORATION, Charlotte, NC (US)

(72) Inventors: Manu Jacob Kurian, Dallas, TX (US); Lalit Dhawan, Cranbury, NJ (US); Sanjeev Verma, Harrisburg, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 319 days.

(21) Appl. No.: 18/096,448

(22) Filed: Jan. 12, 2023

(65) Prior Publication Data
US 2024/0243988 A1  Jul. 18, 2024

(51) Int. Cl.
*H04L 43/10* (2022.01)

(52) U.S. Cl.
CPC .................................. *H04L 43/10* (2013.01)

(58) Field of Classification Search
CPC ..................................................... H04L 43/10
See application file for complete search history.

(56) References Cited

U.S. PATENT DOCUMENTS

| | | | |
|---|---|---|---|
| 9,058,582 B1 * | 6/2015 | Meyers | G06Q 10/08 |
| 9,948,547 B2 | 4/2018 | Agarwal | |
| 9,989,724 B2 | 6/2018 | Raza et al. | |
| 10,120,893 B1 * | 11/2018 | Rocamora | G06Q 10/10 |
| 10,346,635 B2 | 7/2019 | Kumar et al. | |
| 10,412,615 B2 | 9/2019 | Edsall et al. | |
| 10,601,718 B2 | 3/2020 | Twombly et al. | |
| 10,608,918 B2 | 3/2020 | Twombly et al. | |
| 10,609,156 B2 | 3/2020 | Twombly et al. | |
| 10,698,902 B2 | 6/2020 | Lee et al. | |
| 10,714,145 B2 | 7/2020 | Kulkarni et al. | |
| 10,716,060 B2 | 7/2020 | Twombly et al. | |
| 10,812,486 B2 | 10/2020 | Delson et al. | |
| 11,256,821 B2 | 2/2022 | Avidan et al. | |
| 11,341,167 B2 | 5/2022 | Gibson et al. | |
| 2017/0031963 A1 | 2/2017 | Merz et al. | |
| 2017/0048275 A1 | 2/2017 | John et al. | |

FOREIGN PATENT DOCUMENTS

| | | | |
|---|---|---|---|
| CN | 113824622 A | * 12/2021 | |
| WO | WO-0157694 A1 | * 8/2001 | G06F 12/121 |

* cited by examiner

*Primary Examiner* — Michael A Keller
(74) *Attorney, Agent, or Firm* — Moore & Van Allen PLLC; Anoohya Yarlagadda (57) ABSTRACT

Embodiments of the present invention provide a system for segmenting and controlling transmission of data in computing networks. The system is configured for identifying initiation of transmission of a data file from a first storage container to a second storage container via a first network path, wherein the first network path comprises one or more network nodes, in response to identifying initiation of the transmission of the data file, generating a data tag for the data file, wherein the data tag is generated based on one or more file attributes, embedding the data tag into the data file, and allowing the transmission of the data file comprising the data tag, via the first network path and the one or more network nodes.

17 Claims, 6 Drawing Sheets

SYSTEMS FOR SEGMENTING AND CONTROLLING THE TRANSMISSION OF DATA IN COMPUTING NETWORKS

BACKGROUND

There exists a need for a system to dynamically segment and control transmission of data in computing networks.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for segmenting and controlling the transmission of data in computing networks. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies initiation of transmission of a data file from a first storage container to a second storage container via a first network path, wherein the first network path comprises one or more network nodes, in response to identifying initiation of the transmission of the data file, generates a data tag for the data file, wherein the data tag is generated based on one or more file attributes, embeds the data tag into the data file, and allows the transmission of the data file comprising the data tag, via the first network path and the one or more network nodes.

In some embodiments, the data tag comprises at least a header, a body, and a footer.

In some embodiments, the present invention generates a switching logic that causes the data tag to switch between a plurality of modes based on the one or more network nodes that the data file is passing through and inserts the switching logic in the data tag.

In some embodiments, the present invention activates the switching logic in the data tag based on receiving information from the one or more network nodes.

In some embodiments, the present invention causes the data tag to dynamically alter to insert traversal path information associated with the data file based on the information received from the one or more network nodes that the data file is passing through.

In some embodiments, the present invention activates the switching logic in the data tag based on at least one of (i) one or more timers, (ii) location of the data file based on geo-tracking, (iii) historical data associated with the one or more network nodes, or (iv) security level associated with the one or more network nodes.

In some embodiments, the plurality of modes comprise an active mode, a passive mode, and an inactive mode.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that transmits data in computing networks as part of the organizational activities. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, entities transmit data (e.g., data files) from one network point to another network point. However, currently no system exists that can dynamically control the transmission of data to prevent unauthorized use or unauthorized transmission of data to a wrong network point. As such, there exists a need for a system that can dynamically control transmission of data within an electronic network.

Figure 1:
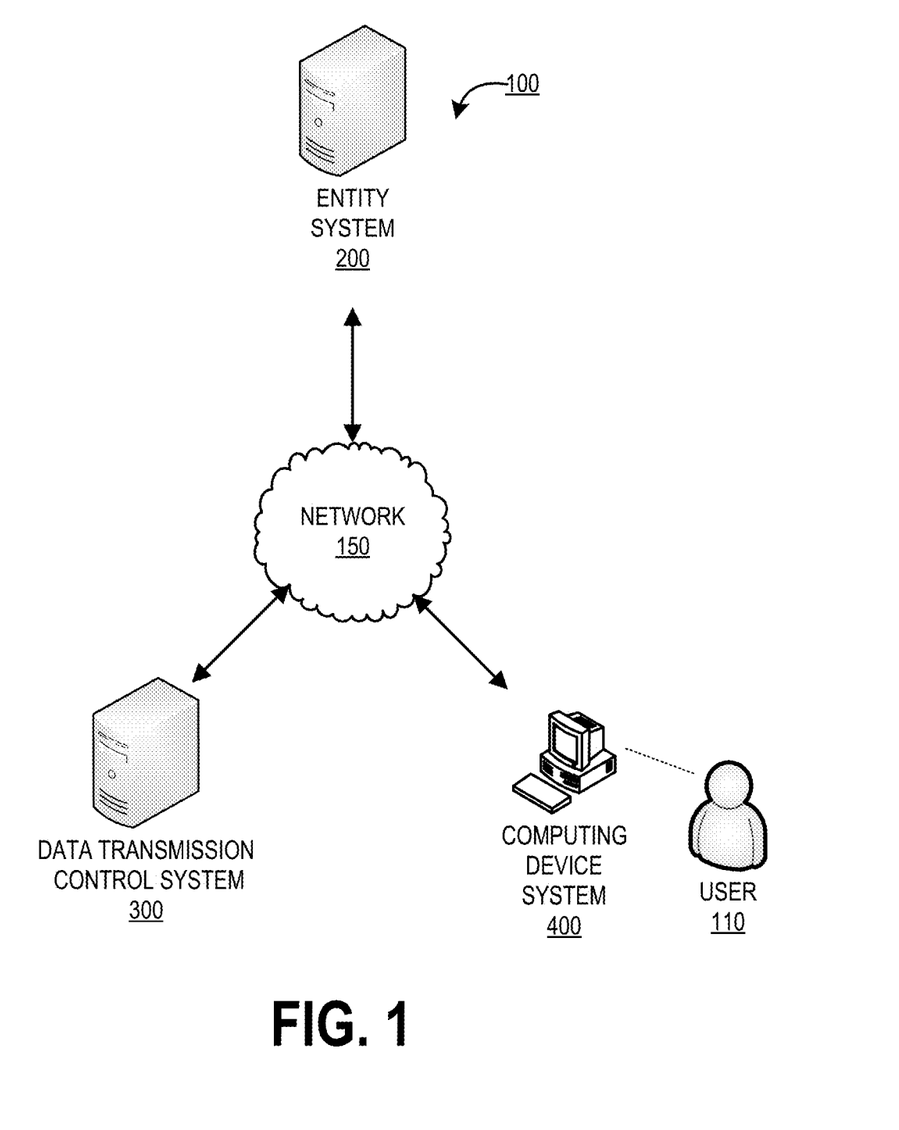
FIG. 1 provides a block diagram illustrating a system environment for segmenting and controlling the transmission of data in computing networks, in accordance with an embodiment of the invention.

FIG. 1 provides a block diagram illustrating a system environment 100 for segmenting and controlling the transmission of data in computing networks, in accordance with an embodiment of the invention. As illustrated in FIG. 1, the environment 100 includes a data transmission control system 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., system administrators, application developers, application owners, application end users, business analysts, finance agents, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities (e.g., transmission of data).

The data transmission control system 300 is a system of the present invention for performing one or more process steps described herein. In some embodiments, the data transmission control system 300 may be an independent system. In some embodiments, the data transmission control system 300 may be a part of the entity system 200.

The data transmission control system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the data transmission control system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the data transmission control system 300, and/or entity system 200 across the network 150.

Figure 2:
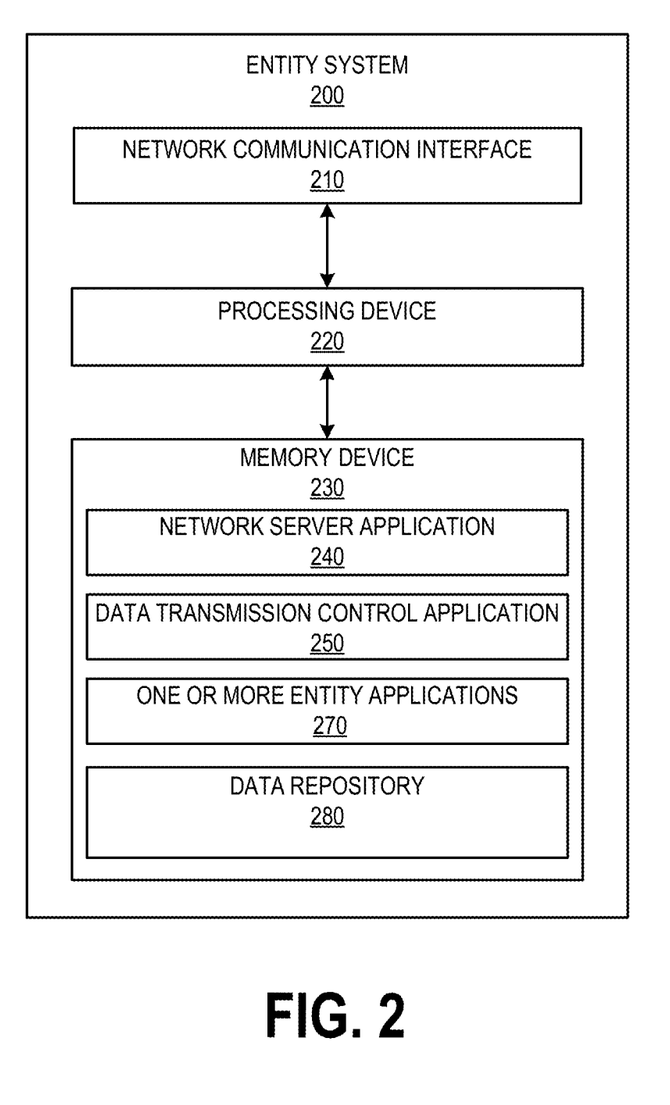
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a data transmission control application 250, one or more entity applications 270, and a data repository 280. The one or more entity applications 270 may be any applications developed, supported, maintained, utilized, and/or controlled by the entity. The computer-executable program code of the network server application 240, the data transmission control application 250, the one or more entity application 270 to perform certain logic, data-extraction, and data-storing functions of the entity system 200 described herein, as well as communication functions of the entity system 200.

The network server application 240, the data transmission control application 250, and the one or more entity applications 270 are configured to store data in the data repository 280 or to use the data stored in the data repository 280 when communicating through the network communication interface 210 with the data transmission control system 300, and/or the computing device system 400 to perform one or more process steps described herein. In some embodiments, the entity system 200 may receive instructions from the data transmission control system 300 via the data transmission control application 250 to perform certain operations. The data transmission control application 250 may be provided by the data transmission control system 300. The one or more entity applications 270 may be any of the applications used, created, modified, facilitated, and/or managed by the entity system 200.

Figure 3:
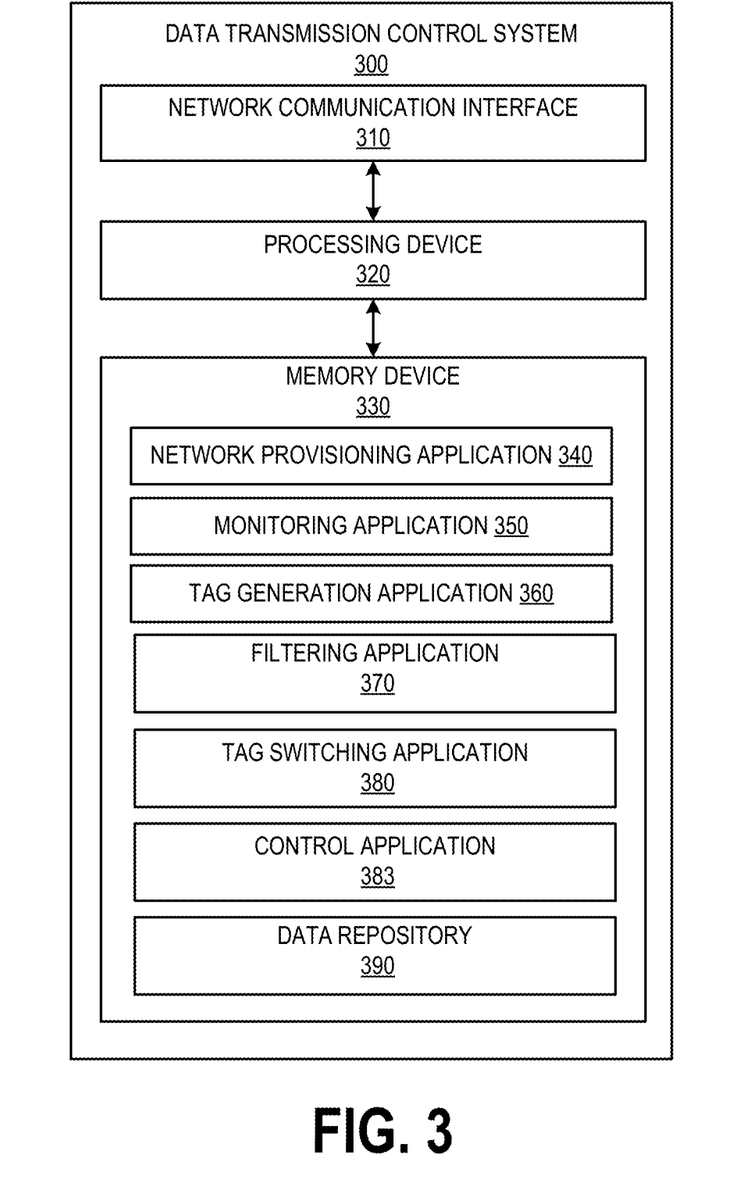
FIG. 3 provides a block diagram illustrating a data transmission control system 300 of FIG. 1, in accordance with an embodiment of the invention.

FIG. 3 provides a block diagram illustrating the data transmission control system 300 in greater detail, in accordance with embodiments of the invention. As illustrated in FIG. 3, in one embodiment of the invention, the data transmission control system 300 includes one or more processing devices 320 operatively coupled to a network communication interface 310 and a memory device 330. In certain embodiments, the data transmission control system 300 is operated by an entity, such as a financial institution. In some embodiments, the data transmission control system 300 is owned or operated by the entity of the entity system 200. In some embodiments, the data transmission control system 300 may be an independent system. In alternate embodiments, the data transmission control system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the data transmission control system 300 described herein. For example, in one embodiment of the data transmission control system 300, the memory device 330 includes, but is not limited to, a network provisioning application 340, a monitoring application 350, a tag generation application 360, a filtering application 370, a tag switching application 380, a control application 383, and a data repository 390 any data processed or accessed by one or more applications in the memory device 330. The computer-executable program code of the network provisioning application 340, the monitoring application 350, the tag generation application 360, the filtering application 370, the tag switching application 380, and the control application 383 may instruct the processing device 320 to perform certain logic, data-processing, and data-storing functions of the data transmission control system 300 described herein, as well as communication functions of the data transmission control system 300.

The network provisioning application 340, the monitoring application 350, the tag generation application 360, the filtering application 370, the tag switching application 380, and the control application 383 are configured to invoke or use the data in the data repository 390 when communicating through the network communication interface 310 with the entity system 200, and/or the computing device system 400. In some embodiments, the network provisioning application 340, the monitoring application 350, the tag generation application 360, the filtering application 370, the tag switching application 380, and the control application 383 may store the data extracted or received from the entity system 200, and the computing device system 400 in the data repository 390. In some embodiments, the network provisioning application 340, the monitoring application 350, the tag generation application 360, the filtering application 370, the tag switching application 380, and the control application 383 may be a part of a single application.

The network provisioning application 340 allows the access control system to send and/or receive one or more communications associated with the process flow described herein. The monitoring application 350 may monitor one or more data communications within the data streams of the entity. The tag generation application 360 generates data tags associated with data that is being transmitted within the data streams of the entity. The filtering application 370 filters the data and data tags associated with the data. The tag switching application 380 switches states of the data tags based on the network path the data is travelling. The control application 383 controls transmission of data to different containers based on the data tags that accompany the data. The operations and functionalities of the network provisioning application 340, the monitoring application 350, the tag generation application 360, the filtering application 370, the tag switching application 380, and the control application 383 are discussed in greater detail below in FIG. 5 and FIG. 6.

Figure 4:
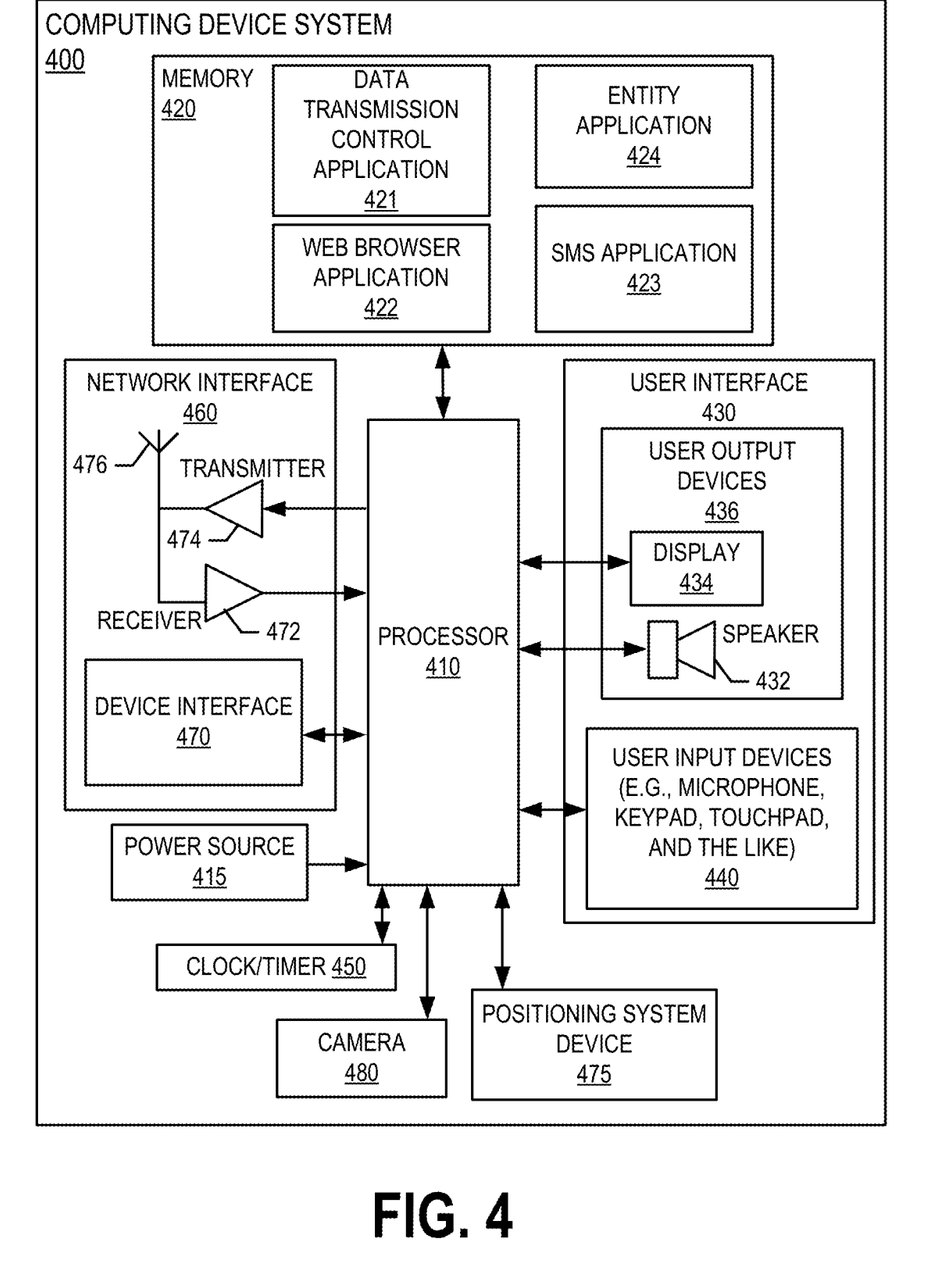
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a data transmission control application 421, entity application 424. These applications also typically instructions to a graphical user interface (GUI) on the display 430 that allows the user 110 to interact with the entity system 200, the data transmission control system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the data transmission control application 421 provided by the data transmission control system 300 allows the user 110 to access the data transmission control system 300. In some embodiments, the entity application 424 provided by the entity system 200 and the data transmission control application 421 allow the user 110 to access the functionalities provided by the data transmission control system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
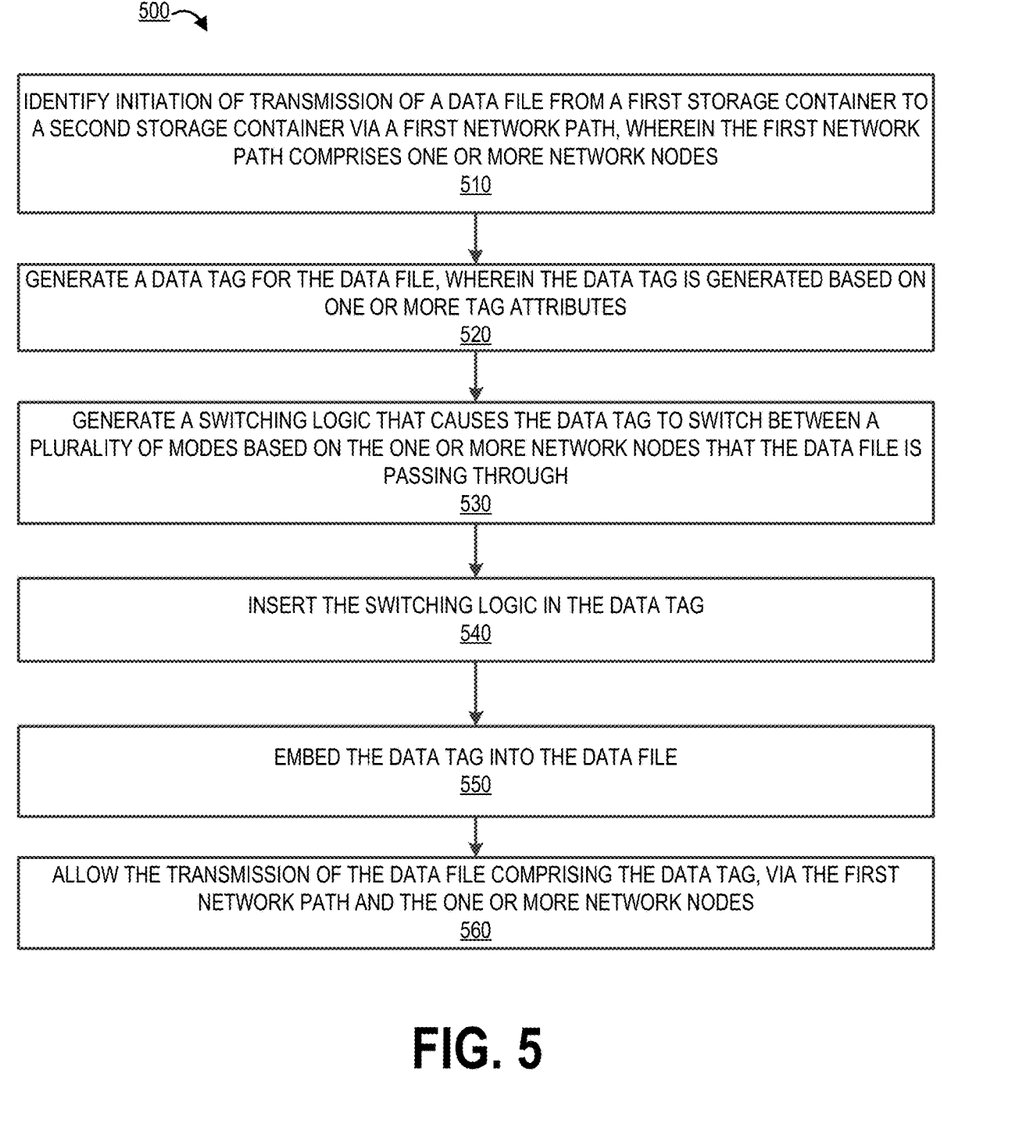
FIG. 5 provides a flowchart illustrating a process flow for segmenting and controlling the transmission of data in computing networks, in accordance with an embodiment of the invention.

FIG. 5 provides a flowchart illustrating a process flow for generating signature bits associated with data packets in a network, in accordance with an embodiment of the invention. As shown in block 510, the system identifies initiation of transmission of a data file from a first storage container to a second storage container via a first network path, wherein the first network path comprises one or more network nodes. The first storage container and the second storage container may be systems associated with an entity. In some embodiments, the data file may be transmitted from a first storage container to a plurality of storage containers associated with the entity. An example of a storage container is the entity system 200 described herein. The data file may be any file comprising data associated with the entity. In some embodiments, the data may be confidential data. In some embodiments, the data may be non-confidential data associated with the entity. In some embodiments, the data may be a combination of confidential data and non-confidential data.

As shown in block 520, the system generates a data tag for the data file, wherein the data tag is generated based on one or more file attributes. In some embodiments, data tag may be an additional file that may be embedded inside the data file. In some embodiments, the data tag may be a file wrapper that accompanies the data file. In some embodiments, the system may assign the data tag a mode, where the mode defines whether any information associated with the data file can be read by the one or more network nodes along the first network path. Data tags may be assigned at least one mode of a plurality of modes, where the plurality of modes may comprise an active mode, a passive mode, and an inactive mode. The active mode of the data tag may allow the one or more network nodes to access information associated with the data file (e.g., origination, destination, type of data in the data file, or the like) and content of the data file. The passive mode of the data tag may allow the one or more network nodes to access information associated with the data file but not the content of the data file. The inactive mode of the data tag may not allow the one or more network nodes to access any kind of information associated with the data file. In some embodiments, the data tag may be assigned a factory mode based on type of data within the data file (e.g., confidential data), origination of the data file, destination of the data file, or the like. For example, the system may determine that the data file comprises confidential data and may assign passive mode status to the data tag.

In some embodiments, the generated data tag may comprise a header, a footer, and a body. The header of the data tag may comprise information associated with a type of the data tag and/or a current mode of the data tag. The body of the data tag may comprise information associated with the one or more file attributes, where the one or more file attributes include, but are not limited to, origination of the data file, destination of the data file, network path to be taken by the data file, type of data within the data file, complexity of data within the data file, and/or the like. In some embodiments, the body of the data tag may be a string of characters.

As shown in block 530, the system generates a switching logic that causes the data tag to switch between the plurality of modes based on the one or more network nodes that the data file is passing through. In some embodiments, the mode of the data file may be switched dynamically during the traversal path of the data file. The switching logic generated by the system may allow the data tag to dynamically switch between the plurality of modes. In some embodiments, the switching logic may comprise one or more pieces of software code that implement the switching mechanism. In some embodiments, the system may also generate one or more triggers to activate the switching logic and may insert the one or more triggers in the data tag, where the one or more triggers automatically implement one or more instructions when triggered. In some embodiments, the system may transmit instructions to activate the switching logic in real-time based on the location of the data file. In some embodiments, the location of the data file may be determined based on geo-tracking of the data file. In some embodiments, the location of the data file may be determined based on information transmitted by the data tag, where the information may be automatically extracted/received from the one or more network nodes along the first network path. As shown in block 540, the system inserts the switching logic in the data tag.

As shown in block 550, the system embeds the data tag into the data file. As shown in block 560, the system allows the transmission of the data file comprising the data tag, via the first network path and the one or more network nodes. In some embodiments, as the data file passes through the one or more network nodes, additional data from containers/systems associated with the one or more network nodes may be added to the data file. In some embodiments, each of the one or more network nodes may further comprise an alteration engine provided by the system of the invention, where the alteration engine may alter the data tag to include information associated with the traversal path of the data file and any alterations to the contents of the data file. In some embodiments, the system or the first container may encrypt the data within the data file before allowing transmission of the data file.

Figure 6:
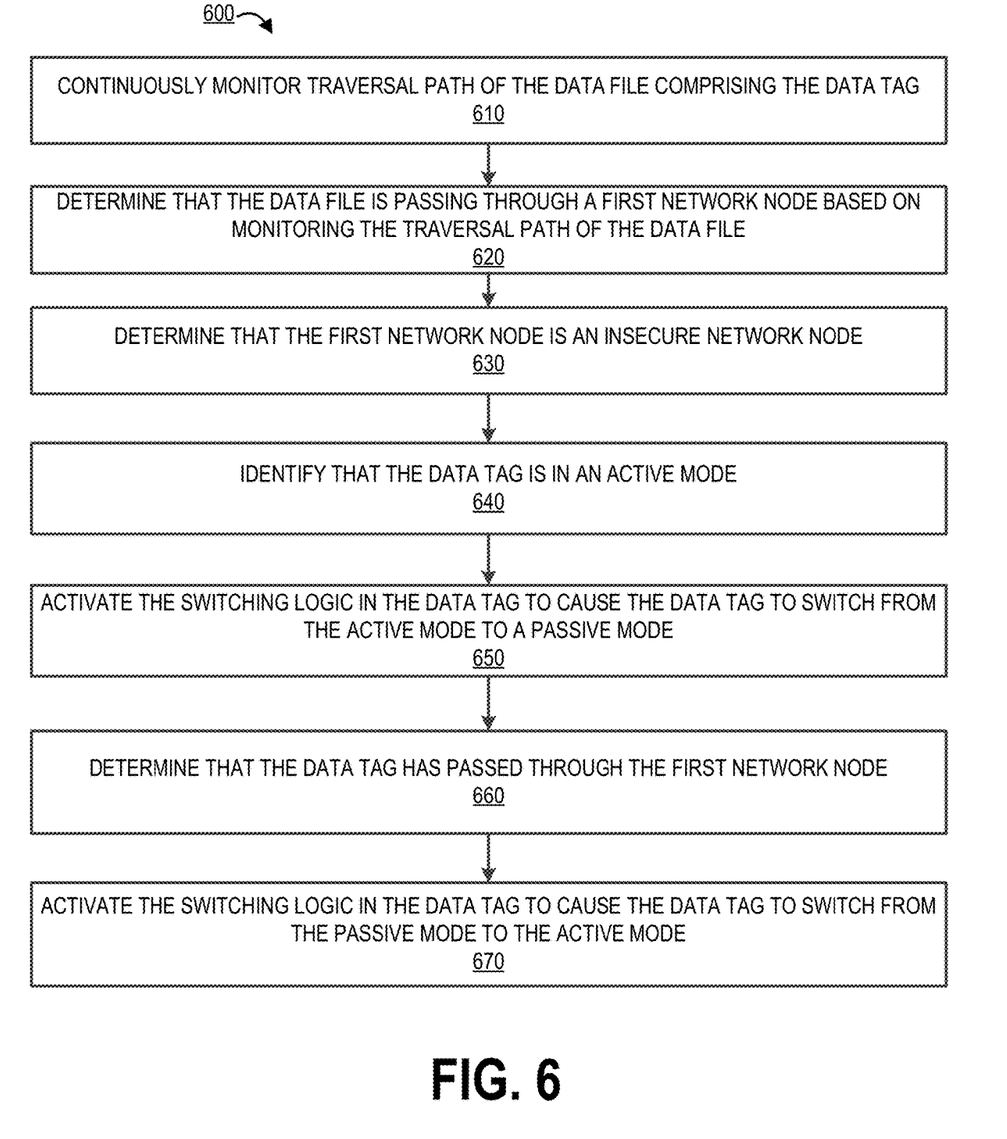
FIG. 6 provides a flowchart illustrating a process flow for dynamically switching states of data tags associated with data that is being transmitted in computing networks, in accordance with an embodiment of the invention.

FIG. 6 provides a flowchart illustrating a process flow for dynamically switching states of data tags associated with data that is being transmitted in computing networks, in accordance with an embodiment of the invention. As shown in block 610, the system continuously monitors traversal path of the data file comprising the data tag. In some embodiments, the system may monitor the traversal path of the data file via geo-tracking the data file. In some embodiments, the system may monitor the traversal path of the data file based on the information transmitted by the data tag, where the instructions to transmit location may be embedded within the body of the data tag while creation of the data tag. As shown in block 620, the system determines that the data file is passing through a first network node based on monitoring the traversal path of the data file.

As shown in block 630, the system determines that the first network node is an insecure network node. The system may determine that the first network node is insecure based on historical data, stored data or real-time data associated with the security features associated with the one or more network nodes, historical event data (e.g., misappropriation events, security related events, or the like), type of network connection (e.g., core network, entity network, third party network, or the like), type of network security, network location (e.g., geographical location), or the like. For example, the system may determine that the first network node is insecure based on determining that the first network node in a blocked geographical location.

As shown in block 640, the system identifies that the data tag is in an active mode. As shown in block 650, the system activates the switching logic in the data tag to cause the data tag to switch from the active mode to a passive mode. In some embodiments, the system may activate the switching logic based on one or more timers that are defined in the body of the data tag, where the one or more timers are set during the creation of the data tag based on the network path selected for the data file. For example, the system may determine that the data file may transmitted via a first network path comprising secure nodes and one insecure node and may further determine that the data file is set to reach the insecure node after 'X' amount of time. The system may then set timer to activate the switching logic after 'X' amount of time. In some embodiments, the system may activate the switching logic dynamically in real-time based on location of the data file based on geo-tracking. In some embodiments, the system may activate the switching logic dynamically in real-time based on historical data associated with the one or more network nodes. In some embodiments, the system may activate the switching logic dynamically in real-time based on security level associated with the one or more network nodes, where the security level associated with the one or more network nodes may be automatically extracted by the data tag/system of the invention or may be received from the one or more network nodes. In some embodiments, the system may activate the switching logic in the data tag to cause the data tag to switch from the active mode to an inactive mode. In some embodiments, in addition to activating the switching mechanism, the system may also implement additional security mechanisms (e.g., adding additional encryption layers, obfuscation of data, redaction of parts of data, self-destruction of data) based on determining that the first network node is insecure network node. In some embodiments, the network path of the data file may change dynamically due to network congestion or other network issues, where the data file may be routed to a new network path, where the new network path may be an unknown network path. In such cases, the system may automatically activate the switching logic and may cause the data tag to dynamically switch to passive mode or inactive mode.

As shown in block 660, the system determines that the data tag has passed through the first network node. As shown in block 670, the system activates the switching logic in the data tag to cause the data tag to switch from the passive mode back to the active mode. In some embodiments, where the system previously switched to the inactive mode in block 650, the system may activate the switching logic in the data tag to cause the data tag to switch from the inactive mode to the active mode or the passive mode.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for segmenting and controlling transmission of data in computing networks, the system comprising:
at least one network communication interface;
at least one non-transitory storage device;
and at least one processing device coupled to the at least one non-transitory storage device and the at least one network communication interface, wherein the at least one processing device is configured to:
identify initiation of transmission of a data file from a first storage container to a second storage container via a first network path, wherein the first network path comprises one or more network nodes;
in response to identifying initiation of the transmission of the data file, generate a data tag for the data file, wherein the data tag is generated based on one or more file attributes;
generate a switching logic that causes the data tag to switch between a plurality of modes based on the one or more network nodes that the data file is passing through;
insert the switching logic in the data tag;
embed the data tag into the data file; and
allow the transmission of the data file comprising the data tag, via the first network path and the one or more network nodes.

2. The system of claim 1, wherein the data tag comprises at least a header, a body, and a footer.

3. The system of claim 1, wherein the at least one processing device is configured to activate the switching logic in the data tag based on receiving information from the one or more network nodes.

4. The system of claim 3, wherein the at least one processing device is configured to cause the data tag to dynamically alter to insert traversal path information associated with the data file based on the information received from the one or more network nodes that the data file is passing through.

5. The system of claim 1, wherein the at least one processing device is configured to activate the switching logic in the data tag based on at least one of (i) one or more timers, (ii) location of the data file based on geo-tracking, (iii) historical data associated with the one or more network nodes, or (iv) security level associated with the one or more network nodes.

6. The system of claim 1, wherein the plurality of modes comprise an active mode, a passive mode, and an inactive mode.

7. A computer program product for segmenting and controlling transmission of data in computing networks, the computer program product comprising a non-transitory computer-readable storage medium having computer executable instructions for causing a computer processor to perform the steps of:
identifying initiation of transmission of a data file from a first storage container to a second storage container via a first network path, wherein the first network path comprises one or more network nodes;
in response to identifying initiation of the transmission of the data file, generating a data tag for the data file, wherein the data tag is generated based on one or more file attributes;
generating a switching logic that causes the data tag to switch between a plurality of modes based on the one or more network nodes that the data file is passing through;
inserting the switching logic in the data tag;
embedding the data tag into the data file; and
allowing the transmission of the data file comprising the data tag, via the first network path and the one or more network nodes.

8. The computer program product of claim 7, wherein the data tag comprises at least a header, a body, and a footer.

9. The computer program product of claim 7, wherein the computer executable instructions cause the computer processor to perform the step of activating the switching logic in the data tag based on receiving information from the one or more network nodes.

10. The computer program product of claim 9, wherein the computer executable instructions cause the computer processor to perform the step of causing the data tag to dynamically alter to insert traversal path information associated with the data file based on the information received from the one or more network nodes that the data file is passing through.

11. The computer program product of claim 7, wherein the computer executable instructions cause the computer processor to perform the step of activating the switching logic in the data tag based on at least one of (i) one or more timers, (ii) location of the data file based on geo-tracking, (iii) historical data associated with the one or more network nodes, or (iv) security level associated with the one or more network nodes.

12. The computer program product of claim 7, wherein the plurality of modes comprise an active mode, a passive mode, and an inactive mode.

13. A computer implemented method for segmenting and controlling transmission of data in computing networks, wherein the method comprises:
identifying initiation of transmission of a data file from a first storage container to a second storage container via a first network path, wherein the first network path comprises one or more network nodes;
in response to identifying initiation of the transmission of the data file, generating a data tag for the data file, wherein the data tag is generated based on one or more file attributes;
generating a switching logic that causes the data tag to switch between a plurality of modes based on the one or more network nodes that the data file is passing through;
inserting the switching logic in the data tag;
embedding the data tag into the data file; and
allowing the transmission of the data file comprising the data tag, via the first network path and the one or more network nodes.

14. The computer implemented method of claim 13, wherein the method comprises activating the switching logic in the data tag based on at least one of (i) one or more timers, (ii) location of the data file based on geo-tracking, (iii) historical data associated with the one or more network nodes, or (iv) security level associated with the one or more network nodes.

15. The computer implemented method of claim 13, wherein the plurality of modes comprise an active mode, a passive mode, and an inactive mode.

16. The computer implemented method of claim 13, wherein the method further comprises activating the switching logic in the data tag based on receiving information from the one or more network nodes.

17. The computer implemented method of claim 16, wherein the method further comprises causing the data tag to dynamically alter to insert traversal path information associated with the data file based on the information received from the one or more network nodes that the data file is passing through.

\* \* \* \* \*